United States Patent [19]

Hata et al.

[11] Patent Number: 4,857,752
[45] Date of Patent: Aug. 15, 1989

[54] PARTS RECOGNITION METHOD AND APPARATUS THEREFOR

[75] Inventors: Kanji Hata, Katano; Masahiro Maruyama, Minoo; Eiji Itemadani, Sakai, all of Japan

[73] Assignee: Matsushita Electric Industrial Co., Ltd., Kadoma, Japan

[21] Appl. No.: 176,369

[22] Filed: Mar. 25, 1988

[30] Foreign Application Priority Data

Mar. 26, 1987 [JP] Japan ............................ 62-72425

[51] Int. Cl.⁴ ............................................. H01J 40/14
[52] U.S. Cl. ................................. 250/578; 250/237 R; 358/101; 358/225
[58] Field of Search ...................... 250/237 R, 578; 350/266, 269, 270; 358/225, 101; 382/8

[56] References Cited

U.S. PATENT DOCUMENTS

| | | | |
|---|---|---|---|
| 3,475,611 | 10/1969 | Kitchener | 250/237 R |
| 4,081,673 | 3/1978 | Swindell | 250/237 R |
| 4,450,579 | 5/1984 | Nakashima et al. | 382/8 |

Primary Examiner—Edward P. Westin
Assistant Examiner—Khaled Shami
Attorney, Agent, or Firm—Cushman, Darby & Cushman

[57] ABSTRACT

A part such as electronic parts is irradiated by diffused light and a silhouette of the parts is sensed by an image sensor, and plural optical systems are placed between the parts and the image sensor, and thereby the silhouette of the parts is divided into plural portions, moreover a shutter having plural openings is provided between the image sensor and the optical system to select one of the plural optical systems; thus one of respective silhouettes of the plural portions is sensed by the image sensor, and the portions are sensed in turn by shifting the shutter.

5 Claims, 7 Drawing Sheets

PARTS RECOGNITION METHOD AND APPARATUS THEREFOR

FIELD OF THE INVENTION AND RELATED ART STATEMENT

1. Field of the Invention

The present invention relates generally to a parts recognition method and an apparatus therefor, and more particularly to an electronic parts recognition method for recognizing positions or shapes of electronic parts, for example, in an electronic parts mounting apparatus and an apparatus for embodying the method.

2. Description of the Related Art

In an electronic parts mounting apparatus in the prior art, as shown in FIG. 8, an electronic parts 1 is held by a mounting head 4 of the electronic parts mounting apparatus. Diffused light 30 is applied to the electronic parts 1 from the mounting head side, and a silhouette of the electronic parts is detected by a detector 33 of an image recognition apparatus 32 of the electronic parts mounting apparatus. Data of the silhouette of the electronic parts 1 detected by the detector 33 is processed by a generally known image processing means (not shown), and the position of the electronic parts 1 is recognized.

In the above-mentioned electronic parts recognition method in the prior art, for example, in case that the image recognition apparatus 32 treats from a small electronic parts which is under 1 mm in length to a large electronic parts which is over 40 mm in length, a picture area of the detector 33 of the image recognition apparatus 32 must be set to be able to recognize the large electronic parts having 40 mm in length. However, in case that the picture area is set in response to the large electronic parts, a detecting precision is deteriorated in recognition of the small electronic parts having 1 mm length. Especially in recognition of leads which are provided in an peripheral portion of an integrated circuit, a small part of the large electronic parts such the integrated circuit must be precisely recognized. However, in the conventional method, a position of the thin lead can not be precisely detected by a detector 33 having wide picture area for covering the large electronic parts. Recently, a number of lead of the integrated circuit increases, and pitch of lead arrangement becomes small in response to increased number of the leads. A high precision detecting is further required in the image recognition apparatus 32.

In order to eliminate the problem, for example, use of a wide detection picture area besides the high precision in the detector 33 of the image recognition apparatus 32, or an increase of number of the image recognition apparatus 32 is considered. However, both measures require very high cost. Furthermore, enlargement of the detecting region by shift of the image recognition apparatus 32 is also attempted, but in such image recognition apparatus the precision of recognition is limited by a mechanical precision of the shifting mechanism. It is not readily to obtain a hgih precision shifting mechanism, thus high precise recognition of the parts can not be realized.

OBJECT AND SUMMARY OF THE INVENTION

An object of the present invention is to provide a parts recognition method and an apparatus therefor for precise recognition of parts regardless of its size.

The parts recognition method in accordance with the present invention comprises the steps of:
holding a part,
irradiating said part by diffused light,
dividing a picture area including the part into plural portions and assigning them to plural optical systems,
selecting one of the plural optical systems that is assigned to the portion enclosing the part by shutter means, and
sensing the portion by an image sensor through the selected one optical systems.

DESCRIPTION OF THE PREFERRED EMBODIMENT

Figure 1A:
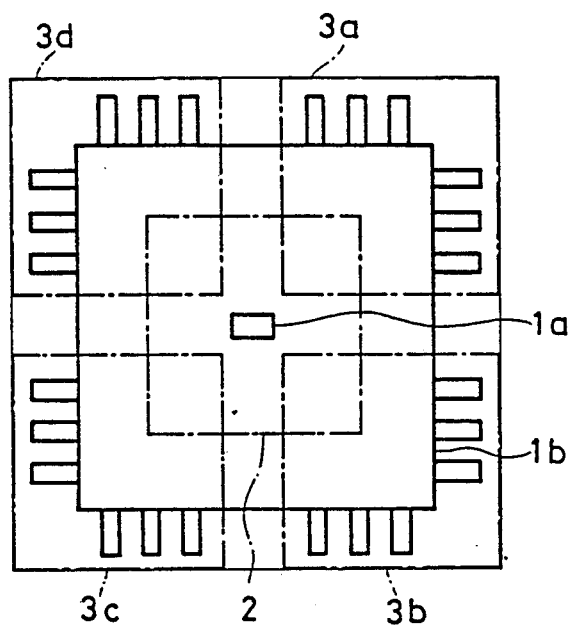
FIG. 1(a) is a plan view of arrangement of picture areas in image recognition of an embodiment in accordance with the present invention.

FIG. 1(A) is a plan view of a recognition area 40 which is divided into five portions 2, 3a, 3b, 3c and 3d in an embodiment of the present invention. Referring to FIG. 1(a), a small electronic parts 1a and a large electronic parts 1b are placed in the recognition area 40. The small part 1a is, for example, a resistor of surface mounting type and the large parts 1b is a flat package type IC, for example.

Figure 2:
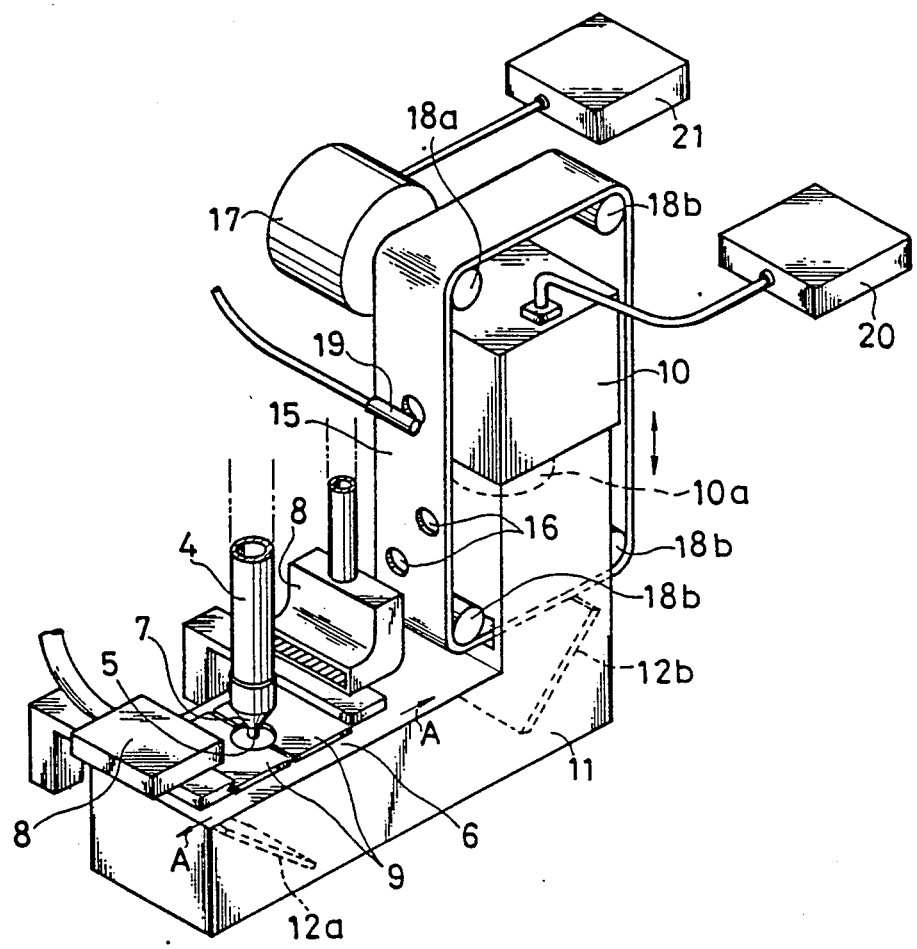
FIG. 2(a) is a perspective view of a parts recognition apparatus in accordance with the present invention.
FIG. 2(b) is a cross-sectional front view of the parts recognition apparatus.

FIG. 2(a) is a perspective view of a parts recognition apparatus for embodying a parts recognition method in accordance with the present invention. Referring to FIG. 2(a), a mounting head 4 has a suction holder 5 at its lower end portion for holding the parts by suction. A corn-shaped reflecting member 7 is formed between the mounting head 4 and the suction holder 5. Two light sources 8 are arranged in both sides of the suction head 4. And the reflecting member 7 is irradiated by the light from the light sources 8. The reflecting member 7 serves as a light diffuser and diffuses the light from the light sources 8 to lower directions.

Figure 3:
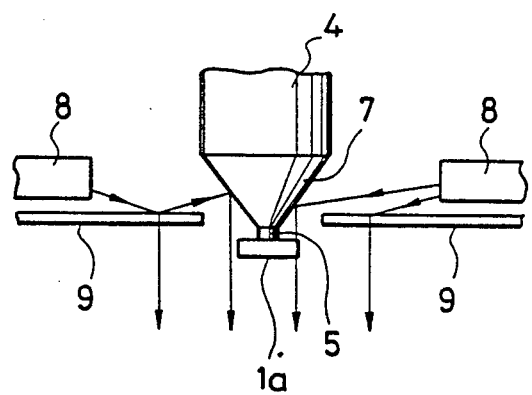
FIG. 3 is a side view of a mounting head holding a small parts in the electronic parts recognition apparatus as shown in FIG. 2(a)
Figure 4:
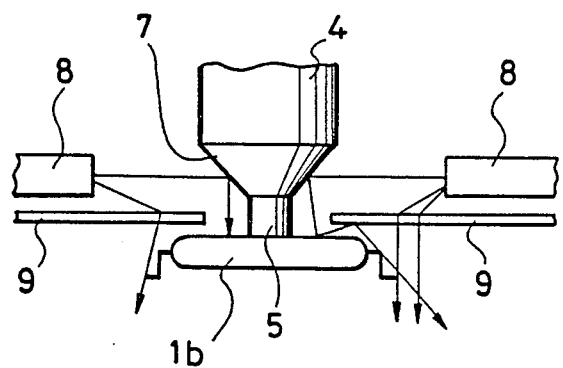
FIG. 4 is a side view of the mounting head holding a large parts of the electronic parts recognition apparatus as shown in FIG. 2(a)

As shown in FIG. 3, the small part 1a held by the suction holder 5 is illuminated by the diffused light from the reflecting member 7. On the other hand, the large part 1b is held by the suction holder 5 as shown in FIG. 4. The suction holder 5 is exchanged with a large one for the large part 1b. The large part 1b is irradiated by the diffused lights from the reflecting member 7 and that from a diffusing plate 9. The diffusing plate 9 is divided into two parts at a central portion, so as to be opened in directions as shown by arrows A when the part 1b is set on the suction holder 5.

Figure 1B:
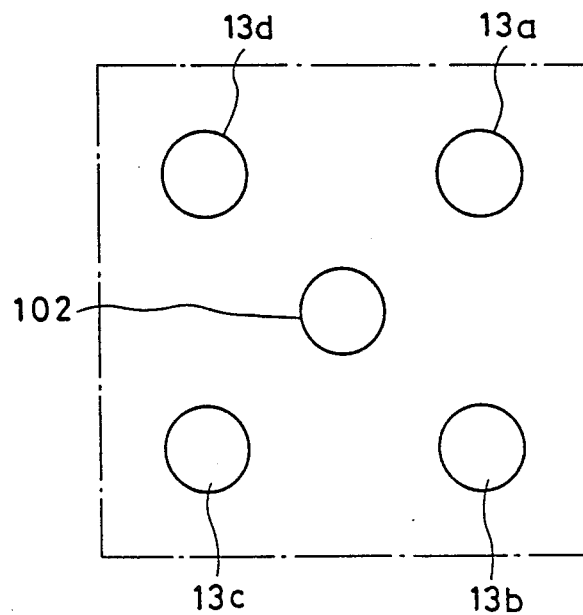
FIG. 1(b) is a plan view of arrangement of lenses in the embodiment.
Figure 2B:
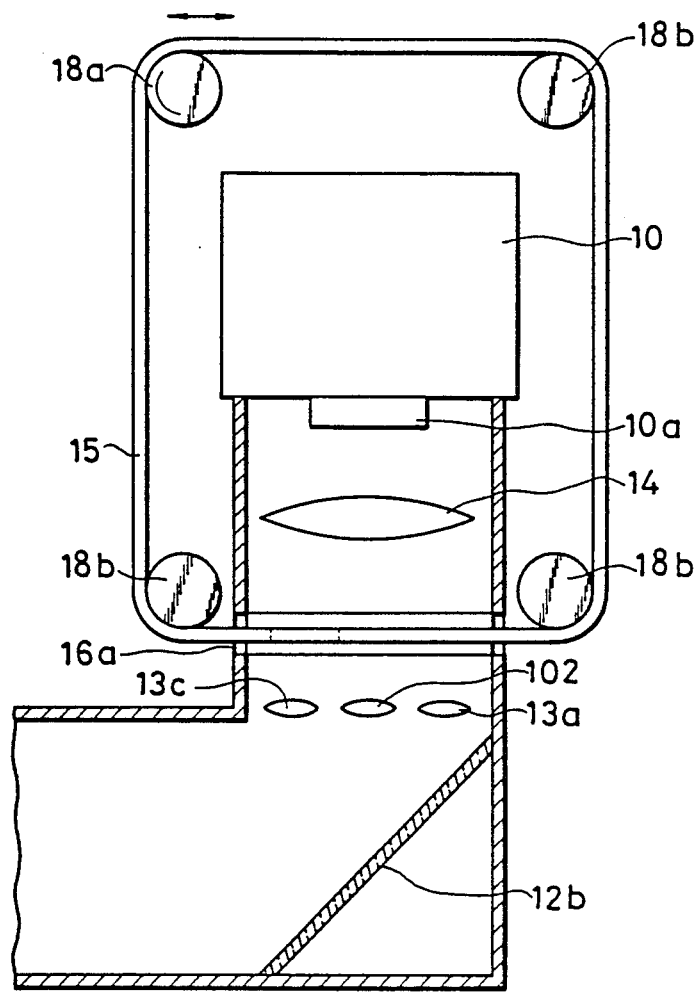

A reflector 12a is mounted under the mounting head 4 in an axis of the mounting head 4 at 45°. A reflector 12b is arranged to face to the reflector 12a with a reflecting surface, and is mounted perpendicular to the reflector 12b. An image recognition apparatus 10 is mounted over the reflector 12b, and an image sensor 10a such as CCD is mounted facing downward. FIG. 2(b) is a side view of optical systems in the image recognition apparatus 10. Referring to FIG. 2(B), a belt-shaped shutter 15 is provided between the image recognition apparatus 10 and the reflector 12b. The belt-shaped shutter 15 has plural openings 16 and is rotatably extended by a driving roller 18a and three guide rollers 18b. The driving roller 18a is driven by a driving motor 17 which is controlled by a controller 21 having a position sensor 19 for sensing the opening of the shutter, and thereby the shutter 15 is shifted. Plural lenses 102, 13a, 13b, 13c and 13d are arranged between the belt-shaped shutter 15 and the reflector 12b. The arrangement of the lenses 102, 13a, 13b, 13c and 13d is shown in a plan view of FIG. 1(b). Furthermore, a lens 14 is arranged between the belt-shaped shutter 15 and the image sensor 10a. An output of the image recognition apparatus 10a is inputted in the image processing apparatus 20.

Figure 5:
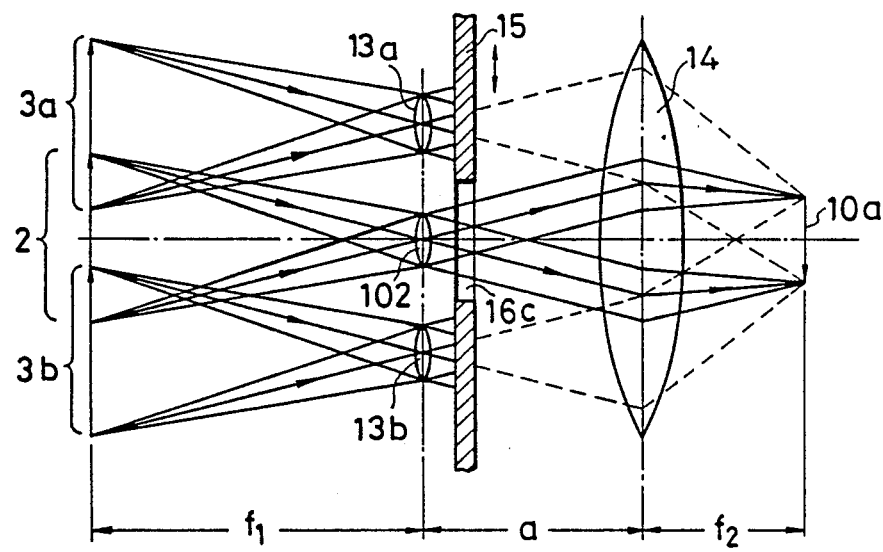
FIG. 5 is a figure showing detecting operation of central picture area in the parts recognition method in accordance with the present invention.

An operation of the embodiment is elucidated hereinafter. As shown in FIG. 3, in case that the small parts 1a is recognized, a central portion 2 of the plural portions as shown in FIG. 1(a) is sensed by the image sensor 10a. As shown in FIG. 5, the opening 16c of the shutter 15 is positioned in an optical path which connects the central portion 2 and the image sensor 10a through the lens 102. Thus, the central portion 2 is sensed by the image sensor 10a. Both the optical path connecting the portion 3a and the image sensor 10a through the lens 13a, and the other optical path connecting the portion 3b and the image sensor 10a through the lens 13b are intercepted by the shutter 15. Consequently the portions 3a and 3b are not sensed by the image sensor 10a.

Figure 6:
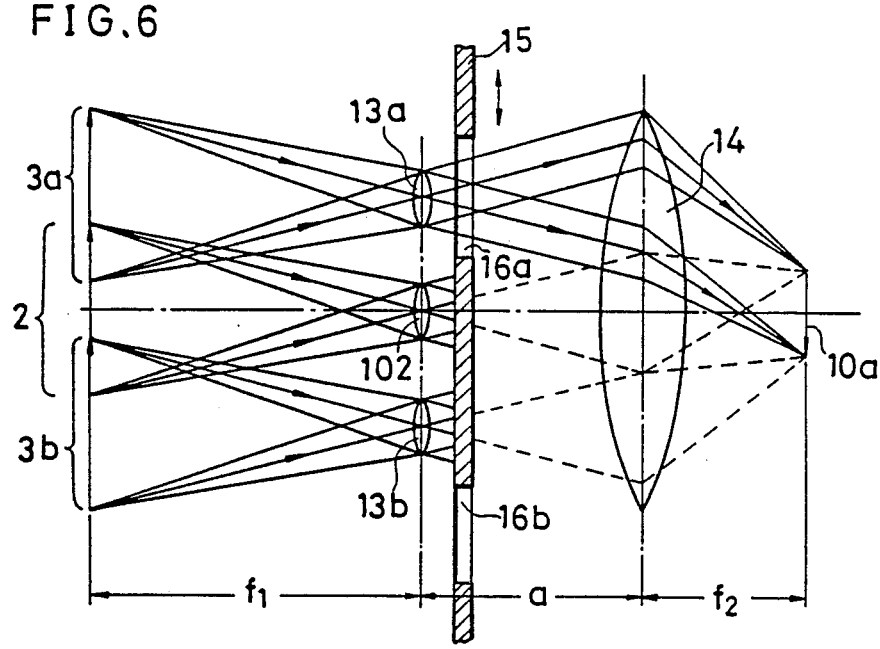
FIG. 6 and FIG. 7 are figures showing detecting operations of peripheral picture area in the part recognition method in accordance with the present invention.

In recognition of the large part 1b as shown in FIG. 4, a peripheral portion of the part 1b is divided into four portions 3a, 3b, 3c and 3d, and respective portions are recognized in turn. Firstly, operation of recognition of the portion 3a is shown in FIG. 6. Referring to FIG. 6, the reflectors 12a and 12b are omitted. The shutter 15 is moved so that the opening 16a is positioned in an optical path of the lens 13a. The light from the portion 3a is incident to the image sensor 10a through the lens 13a, the opening 16a and the lens 14. On the other hand, a light from the portion 13b is intercepted by the shutter 15, and can not enter the image sensor 10a. Consequently, the portion 3a is recognized by the image recognition apparatus 10a.

Figure 7:
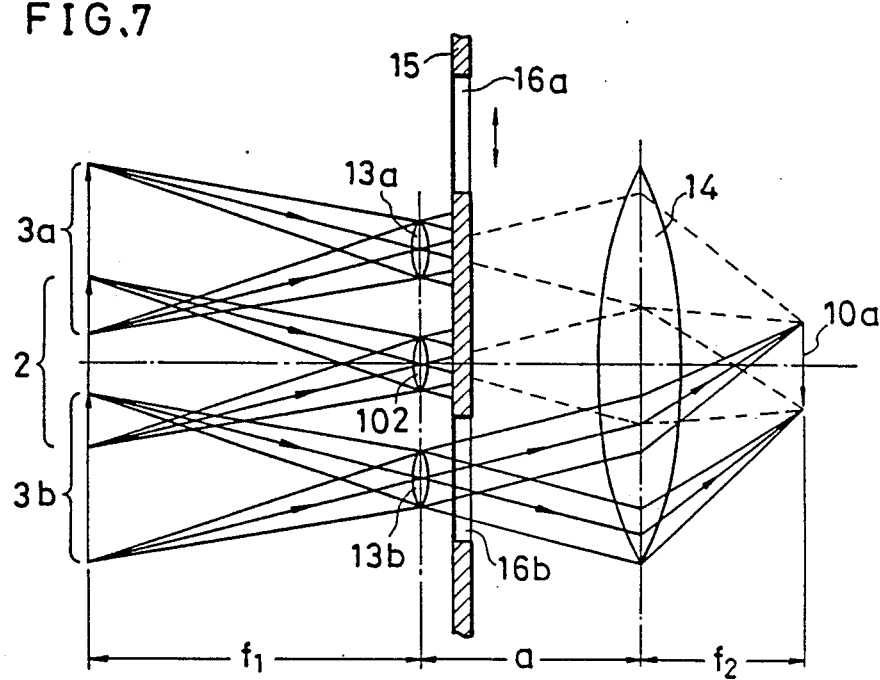
Figure 8:
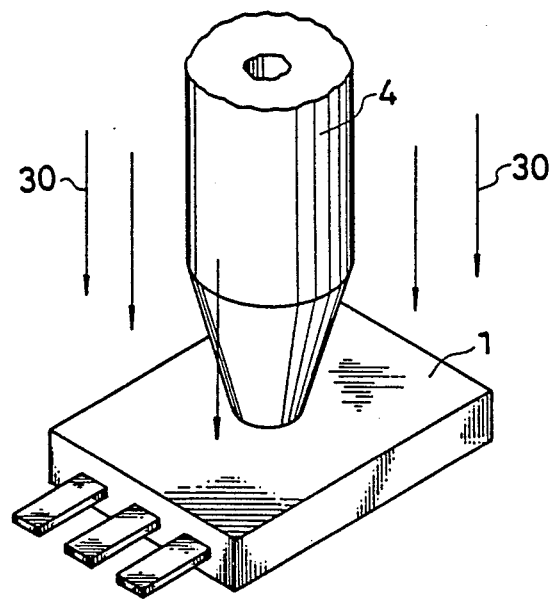
FIG. 8 is a perspective view showing the detecting method in the prior art.
Figure 8:
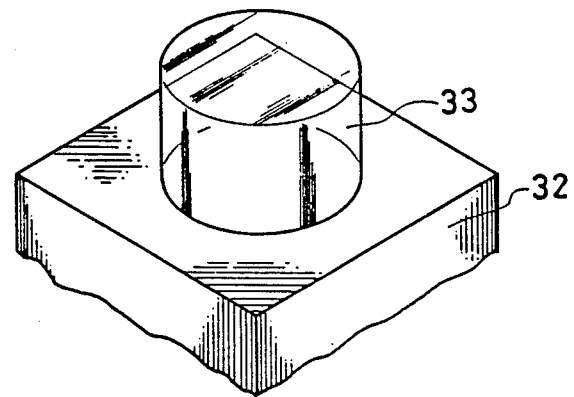

Secondly, in recognition of the portion 3b, as shown in FIG. 7, the shutter 15 is moved so that the opening 16a of the shutter 15 is positioned in an optical axis of the lens 13b. Consequently, the light from the portion 3b enters in the image sensory 10a through the lens 13b, opening 16b and lens 14.

In the above-mentioned optical system, a distance $f_1$ between the portions 3a and the lens 13a is selected to be a focal distance of the lens 13a, and a distance $f_2$ between the lens 14 and the image sensor 10a is also selected to be a focal distance of the lens 14. Therefore, a collimator is formed by the lens 13a and 14. Thus a magnification of an image of the portion 3a on the image sensor 10a depends on a ratio between focal distances of both the lenses.

The shutter 15 is shifted by the driving motor 17, and the optical paths between the respective portions 2, 3a, 3b, 3c and 3d and the image sensor 10a are switched in turn, and all the portions are recognized.

In the embodiment, the silhouette of the parts is sensed. As another embodiment, an image of the parts can be sensed by illuminating the surface of the parts. Furthermore, various shutter means such as diaphragm shutter or liquid crystal shutter is applicable to these embodiments.

According to the present invention, the respective areas divided in plural portions are enlarged and recognized by periodic switching of the plural optical systems which are composed of the plural lenses corresponding to the respective areas and the common lens by the shutter. Therefore, the shape of the parts is recognized with high precision, and the precision is substantially independent of the size of the parts.

Although the invention has been described in its preferred form with a certain degree of particularity, it is understood that the present disclosure of the prepared form has been changed in the details of construction and the combination and arrangement of parts may be resorted to without departing from the spirit and the scope of the invention as hereinafter claimed.

What is claimed is:

1. A parts recognition method comprising the steps of:
   holding a part,
   irradiating said part by diffused light,
   dividing a picture area including said part into plural portions and assigning them to plural optical systems,
   selecting one of said plural optical systems that is assigned to the portion enclosing part by shutter means, and
   sensing said portion by an image sensor through said selected one optical system.

2. A parts recognition apparatus comprising:
   holding means for holding parts,
   illuminating means for irradiating said parts by diffused light,
   plural optical systems for dividing a shape of said parts into plural portions,
   shutter means for selecting one of said plural optical systems,
   an image sensor for sensing a portion through said selected one optical system.

3. A parts recognition apparatus in accordance with claim 1, wherein
   said shutter means is a belt which is placed between optical paths from said parts to said image sensor and has plural openings for passing the light, and is moved by a driving means.

4. A parts recognition apparatus in accordance with claim 1, wherein
   said optical systems comprise a first optical system composing of plural lenses which are positioned substantially adjacent to said parts and a second lens which is positioned substantially adjacent to said image sensor.

5. A parts recognition apparatus in accordance with claim 1, wherein
   said shutter means is placed between said first optical system and said second lens.

* * * * *